(12) United States Patent
Johnson et al.

(10) Patent No.: US 7,698,731 B2
(45) Date of Patent: Apr. 13, 2010

(54) SECURITY ARCHITECTURE AND MECHANISM TO ACCESS AND USE SECURITY COMPONENTS IN OPERATING SYSTEM

(75) Inventors: Stephen L. Johnson, Erdenheim, PA (US); Jinhong Katherine Guo, West Windsor, NJ (US); Il-Pyung Park, Princeton Junction, NJ (US)

(73) Assignee: Panasonic Corporation, Osaka (JP)

( * ) Notice: Subject to any disclaimer, the term of this patent is extended or adjusted under 35 U.S.C. 154(b) by 897 days.

(21) Appl. No.: 10/973,067

(22) Filed: Oct. 25, 2004

(65) Prior Publication Data

US 2006/0090193 A1    Apr. 27, 2006

(51) Int. Cl.
    *G06F 17/00* (2006.01)
(52) U.S. Cl. .............................. 726/1; 726/2; 709/217; 709/219; 709/229
(58) Field of Classification Search ................. 726/1–2, 726/11, 13, 23, 7; 707/9–10, 102; 382/226; 341/79; 713/164–165; 375/354; 370/286, 370/289; 709/217–218, 229
    See application file for complete search history.

(56) References Cited

U.S. PATENT DOCUMENTS

| | | | |
|---|---|---|---|
| 6,115,819 A | 9/2000 | Anderson | |
| 6,134,313 A | 10/2000 | Dorfman et al. | |
| 6,148,083 A | 11/2000 | Fieres et al. | |
| 6,158,010 A * | 12/2000 | Moriconi et al. | 726/1 |
| 6,484,261 B1 * | 11/2002 | Wiegel | 726/11 |
| 6,598,067 B1 | 7/2003 | Wydra et al. | |
| 6,606,708 B1 | 8/2003 | Devine et al. | |
| 6,658,571 B1 * | 12/2003 | O'Brien et al. | 726/26 |
| 6,917,975 B2 * | 7/2005 | Griffin et al. | 709/225 |
| 6,934,757 B1 * | 8/2005 | Kalantar et al. | 709/229 |
| 7,131,000 B2 * | 10/2006 | Bradee | 713/164 |
| 7,143,439 B2 * | 11/2006 | Cooper et al. | 726/11 |

* cited by examiner

*Primary Examiner*—Thanhnga B Truong
(74) *Attorney, Agent, or Firm*—Harness, Dickey & Pierce, P.L.C.

(57) ABSTRACT

A security architecture is provided for accessing security components associated with an operating system. The security architecture is generally comprised of: a policy tree storing a plurality of security policies, where each security policy is define as at least one system call which correlates to a security operation and a corresponding security component for executing the security operation; and a policy manager adapted to intercept system calls from the operating system and operable to determine an applicable response based on the policy tree. The policy tree and the policy manager reside in a protected memory space of the execution environment.

13 Claims, 4 Drawing Sheets

SECURITY ARCHITECTURE AND MECHANISM TO ACCESS AND USE SECURITY COMPONENTS IN OPERATING SYSTEM

FIELD OF THE INVENTION

The present invention relates generally to system security and, more particularly, to a security architecture for accessing security components associated with an operating system.

BACKGROUND OF THE INVENTION

Most modern operating systems being used with consumer electronic devices are based on discretionary access security. As consumer electronic devices become more networked, such security is not considered adequate. In addition, these operating systems do not provide a flexible mechanism for enhancing security. One way to encourage adding security is to provide a security framework which will encapsulate the building blocks in one well, known region having well defined inputs and outputs.

A few objectives for such a security framework are as follows: first, to present a common application programming interface for various security components to entities outside of the kernel; second, to ensure user level interactions with security components stays consistent even as lower level components change over time; and third, to establish a well defined communication path with the security components that reside within the security framework. The present invention presents a security architecture designed to meet these as well as other objectives.

SUMMARY OF THE INVENTION

In accordance with the present invention, a security architecture is provided for accessing security components associated with an operating system. The security architecture is generally comprised of: a policy tree storing a plurality of security policies, where each security policy is define as at least one system call which correlates to a security operation and a corresponding security component for executing the security operation; and a policy manager adapted to intercept system calls from the operating system and operable to determine an applicable response based on the policy tree. The policy tree and the policy manager reside in a protected memory space of the execution environment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
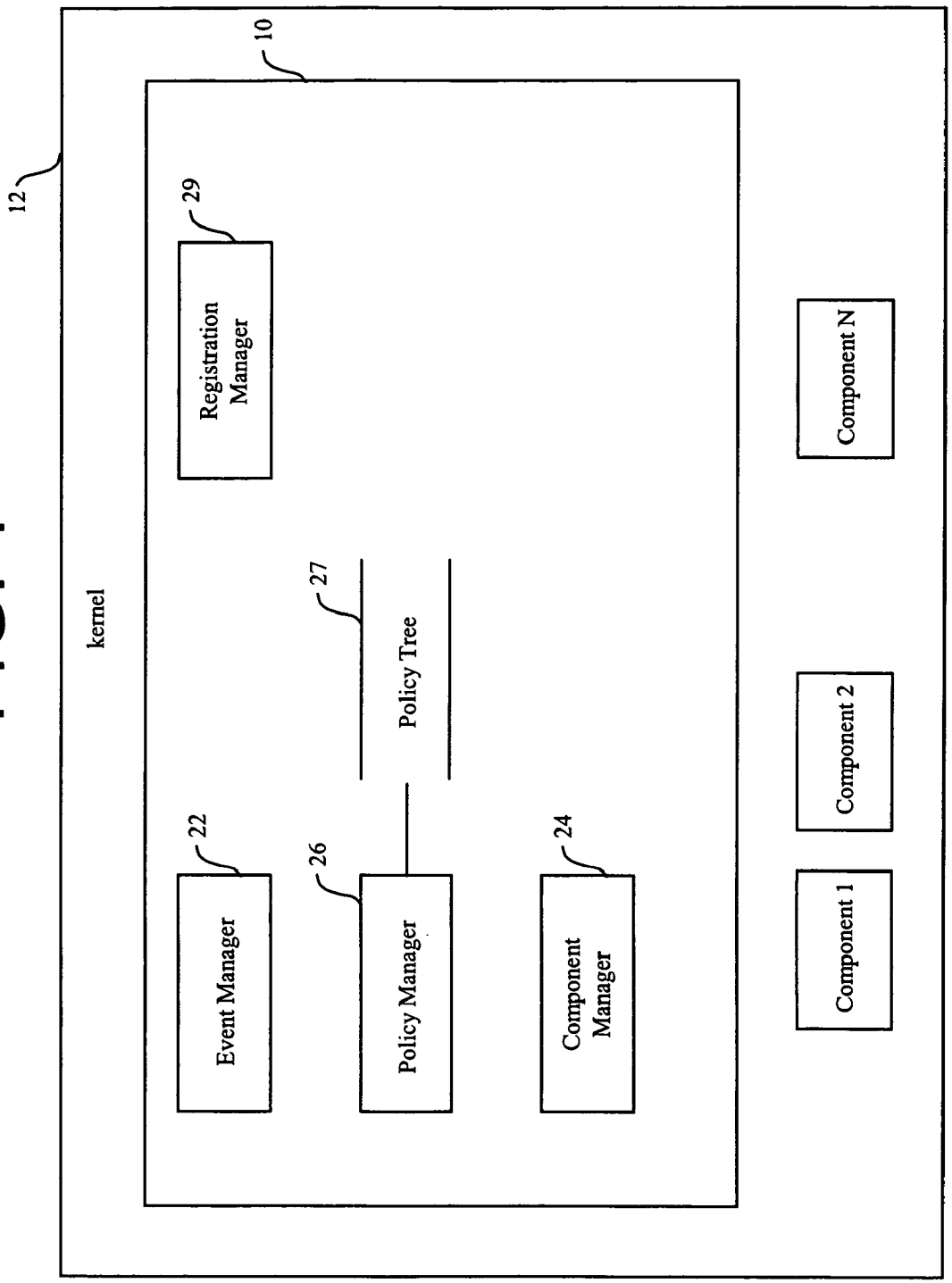
FIG. 1 is a block diagram of a security architecture in accordance with the present invention.

An exemplary embodiment of a security architecture 10 in accordance with the present invention is depicted in FIG. 1. The security architecture 10 is comprised generally of an event manager 22, a component manager 24, a policy manager 26 and a registration manager 29. Thus, the overall design consists of several different software modules—each one separating out some security operation. This modularity will allow the framework to be highly configurable, with relatively straightforward changes required to modify or extend the security presented within this framework.

Various events may trigger requests for security operations from an operating system residing in an execution environment. Such events are typically in the form of a system call made by an application to the operating system. Specifically, the system call are handled by a kernel portion 12 of the operating system. Within the execution environment, applications and certain portions of the operating system will typically reside in a user designated memory space; whereas, the kernel portion of the operating system, including the security architecture 10 of the present invention, reside in a protected memory space.

Figure 2:
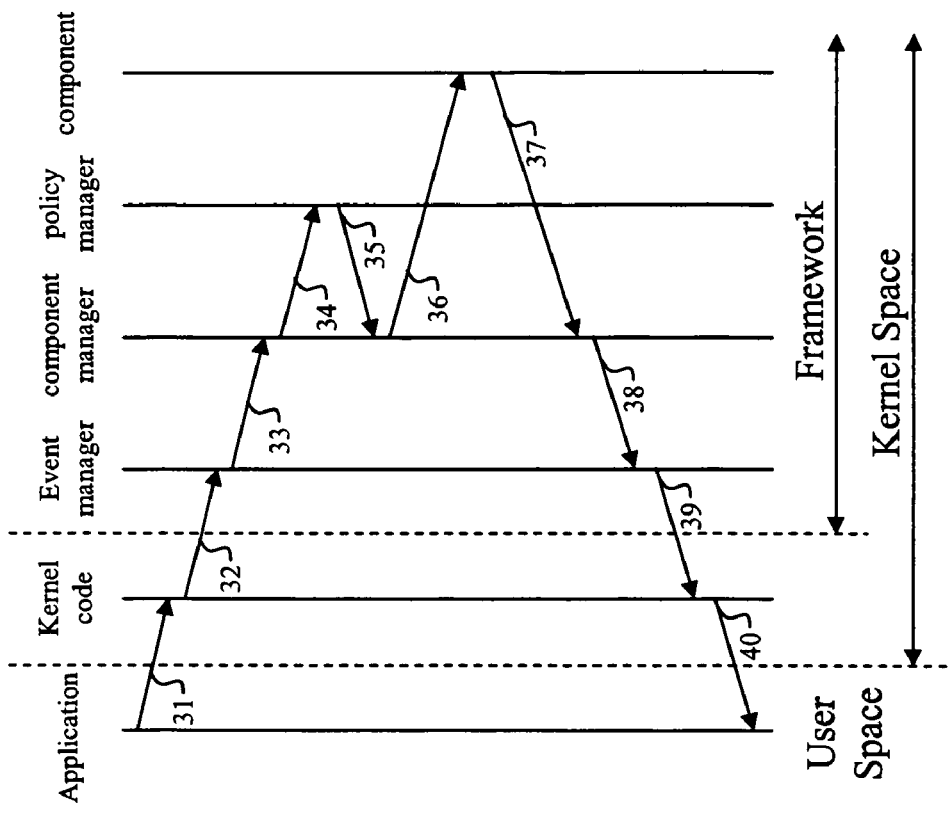
FIG. 2 is a timing diagram illustrating how security components are executed within the security architecture of the present invention.
Figure 3:
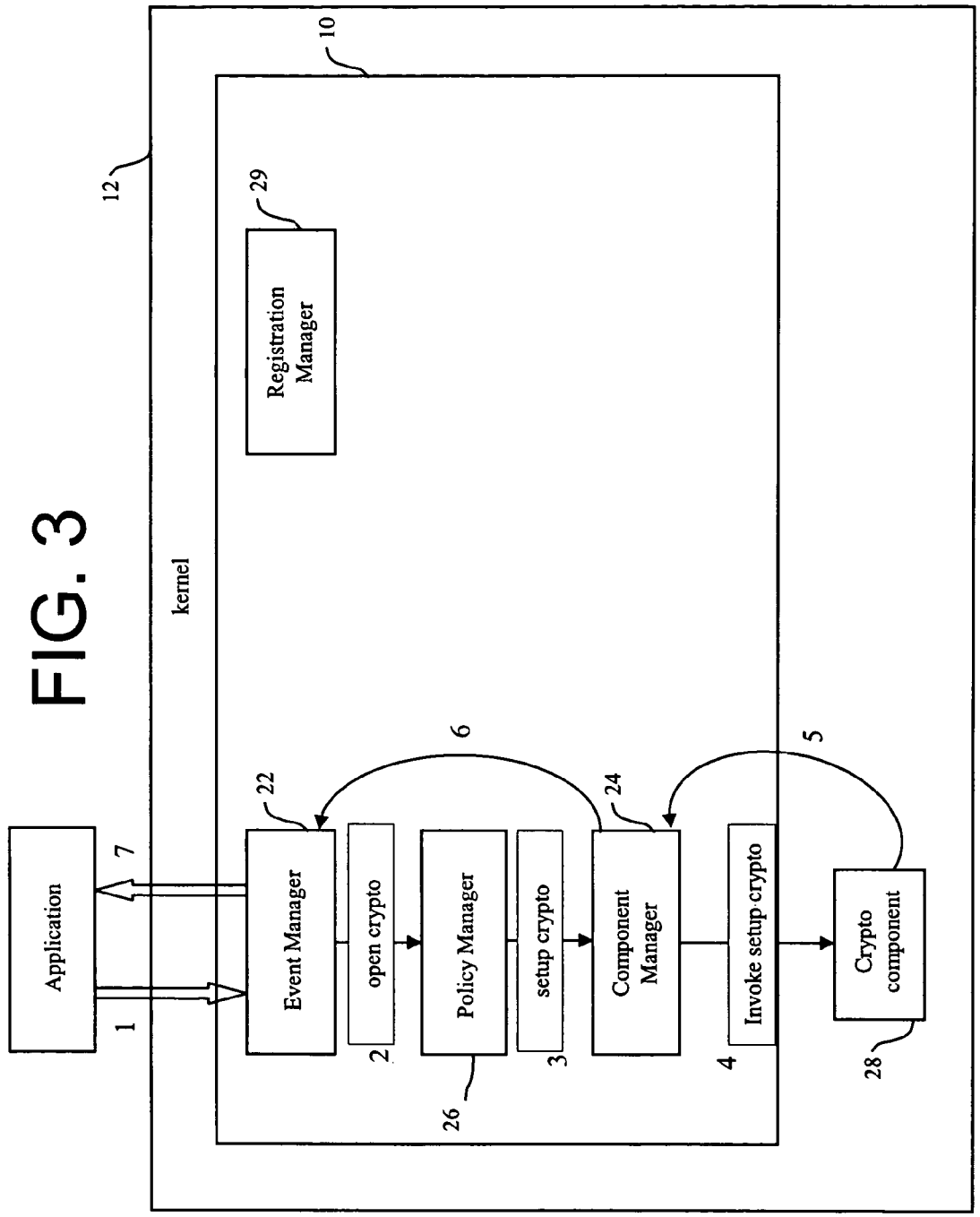
FIG. 3 is a diagram illustrating an exemplary policy path and the associated component structure.

FIGS. 2 and 3 illustrate an example of a system call handled by the security architecture of the present invention. The system call is first passed through a kernel interface at 31 to an event manager at 32. The event manager 22 verifies if the system call is to be handled by the security architecture. In an exemplary embodiment, the event manager 22 may compare the system call to a stored list of events. If there is a match, the event manager 22 passes control at 33 to a component manager 24. It is envisioned that the event manager 22 may employ other types of verification techniques.

Security policies are wide ranging, consisting of comprehensive rules that define the capabilities of processes to access different files and directories to more simple rules that say a downloaded file must be scanned for viruses. Thus, the security policies are the rules that regulate all of system security. It is envisioned that security policies may be user configurable, compiled into the security framework, and/or downloaded or updated dynamically.

A policy manager 26 is employed to maintain the policies for the security architecture. When some event occurs, a security policy is first consulted to determine the appropriate response. Thus, the component manager 24 first passes control at 34 to the policy manager 26.

The policy manager 26 in turn searches for security policies which correlate to the system call, where the security policies are stored in a data store referred to as a policy tree 27. In an exemplary embodiment, each security policy defines at least one system call which correlates to a security operation and a corresponding security component for executing the security operation. For example, an open system call may correspond to a setupCrypto operation provided by the Crypto component 28 as shown in FIG. 3. However, it is readily understood that a system call may correlate to more than one security operation and each security operation may be executed by the same or a different security component.

Next, the component manager 24 initiates execution of the applicable security components as designated at 36. To do so, identifying information for the security operations and corresponding security components are returned by the policy manager 26 at 35 to the component manager 24. The component manager 24 then invokes a component function which performs the requested security operation. In the case of the open system call, the component manager 24 invokes at least the setupCrypto function of the Crypto component. Thus, the component manager 24 manages the different security components which may be needed to respond to a given system call.

Once the security component has completed the invoked function(s), notification is sent at 37 to the component manager 24. If more than one security component is needed to handle a given system call, the component manager 24 coordinates the results. Lastly, the component manager 24 returns control at 38 to the event manager 22 which in turn passes control via the kernel at 39 to the application.

In an exemplary embodiment, the security architecture of the present invention may be implemented as a Linux Security Module that cooperatively operates with a Linux operating system. This approach allows the reuse of already established "security" hooks in the kernel. When kernel execution hits one of the defined security points, control is transferred to the security module—in this case the security architecture described above. By extending the standard Linux Security Module, the security architecture of the present invention provides support for multiple, simultaneously executed sub-modules (i.e., security components). Additionally, since there is a single framework through which the various security components are activated, it is further envisioned that the security architecture can support more sophisticated operations—e.g., dynamic update or replacement of security components.

When the security architecture is implemented as a Linux Security Module (LSM), the kernel calls that LSM intercepts correspond to the events being monitored. When one of the events occurs, control is transferred to the appropriate part of the framework (as is always done in an LSM), and there further decisions can be made concerning what to do with the event, i.e. whether or not a component has registered some action against that event. While the above description was provided with reference to the Linux operating system, it is readily understood that the broader aspects of the present invention are applicable to other operating systems residing in different execution environments.

Exemplary data structures which may be used to implement the security architecture are also described. All the possible events are represented in the COMP_OPS enum data structure. Thus, this is merely an entire list of the LSM entry points. An exemplary structure follows:

```
Enum COMP_OPS  {
    FW_SETHOSTNAME = 0,
    FW_SETDOMAINNAME,
    FW_REBOOT,
    FW_IOPERM,
    ...
    FW_SKB_RECV_DATAGRAM,
    FW_SKB_FREE_SECURITY,
    FW_OPS_MAX
}.
```

Notice that there is an extra entry, FW_OPS_MAX, which must remain at the end since it represents the actual number of entries in the enum.

The comp_list_entry data structure makes up the policy tree. When a policy is passed to the framework by the component at registration time, it contains a path and a set of actions to do when that path is matched. That policy is parsed into a set of comp_list_entry structures. A comp_list_entry can be found on three different linked lists: the general_list that is a linked list of all components under the event that will trigger them, the policy_list that is a linked list associated with an event and also a path in the policy tree, and a list of all parts of a given component. The comp_index field is the unique index that the component received when it registered. The event_index field is the COMP_OPS entry for the triggering event. The comp_func field is the address of the function in the component that gets called when the associated event occurs. An exemplary structure follows:

```
Struct comp_list_entry
{
    struct list_head    general list;
    struct list_head    policy_list;
    struct list_head    component;
    unsigned int        comp_index;
    enum COMP_OPS       event_index;
    int                 (*comp_func) ( );
}.
```

The event_list_entry data structure is the head of a list of comp_list_entry entries. The comp_list_entry is linked in with the policy_list. When an event occurs and the corresponding path matches a path in the policy tree, the events associated with that policy tree node are checked to see if they mach the current event. The event_index field in this structure is what is checked. The event_list field links other events that are associated with the policy node. The comp_func_list links to the component functions (a comp_list_entry entry) that are executed when that event happens. An exemplary structure follows:

```
Struct event_list_entry
{
    enum COMP_OPS       event_index;
    struct list_head    event_list;
    struct list_head    comp_func_list;
}.
```

The comp_list_head is the head of a list of components. This list consists of all the components and for each component, the corresponding comp_list_entry. The index field is the component's unique id received at registration. The comp_list field is the list of component's comp_list_entry structs. The all_components field is the list of all the other components, linking to another comp_list_head. An exemplary structure follows:

```
Struct comp_head
{
    char                name [MAX_COMP_NAME];
    int                 index;
    struct list_head    comp_list;
    struct list_head    all_components;
}.
```

This comp_list_entry struct makes up the policy path tree. It corresponds to the directory structure of the path name associated with "events". The pn_children field points to the children of a directory entry. The pn_chain field points to siblings at the same level under a common parent. The pn_event field points to a list of events that will trigger some component functions. The pn_name and pn_path fields point to the file (directory) name and its full path. An exemplary structure follows:

```
Struct policy_node_entry {
    Struct list_head           pn_children;
    Struct list_head           pn_chain;
    Struct list_head           pn_event;
    Char                       *pn_name;
    Const char                 *pn_path;
}.
```

The policy_rule data structure is passed to the framework's registration module when a component is initialized by the system. It contains the policy structure associated with the component that the component wishes the framework to manage. It currently consists of two fields: a path and a policy_part. The path is a full path to a file or directory. When the path occurs in combination with an event (contained in the policy part), the corresponding component function (also contained in the policy part) will be executed. An exemplary structure follows:

```
Struct policy_rule {
    Char * path;
    Struct component_operations * policy_part;
}.
```

Lastly, the component_operations data structure is part of the policy associated with a component. The op_index field is the event that triggers the policy check. The component_func field is the address of the component function that is called when the event and corresponding path match. An exemplary structure follows:

```
Struct component_operations
{
    enum COMP_OPS op_index;
    int            (*component_func) ( )'
}.
```

Figure 4:
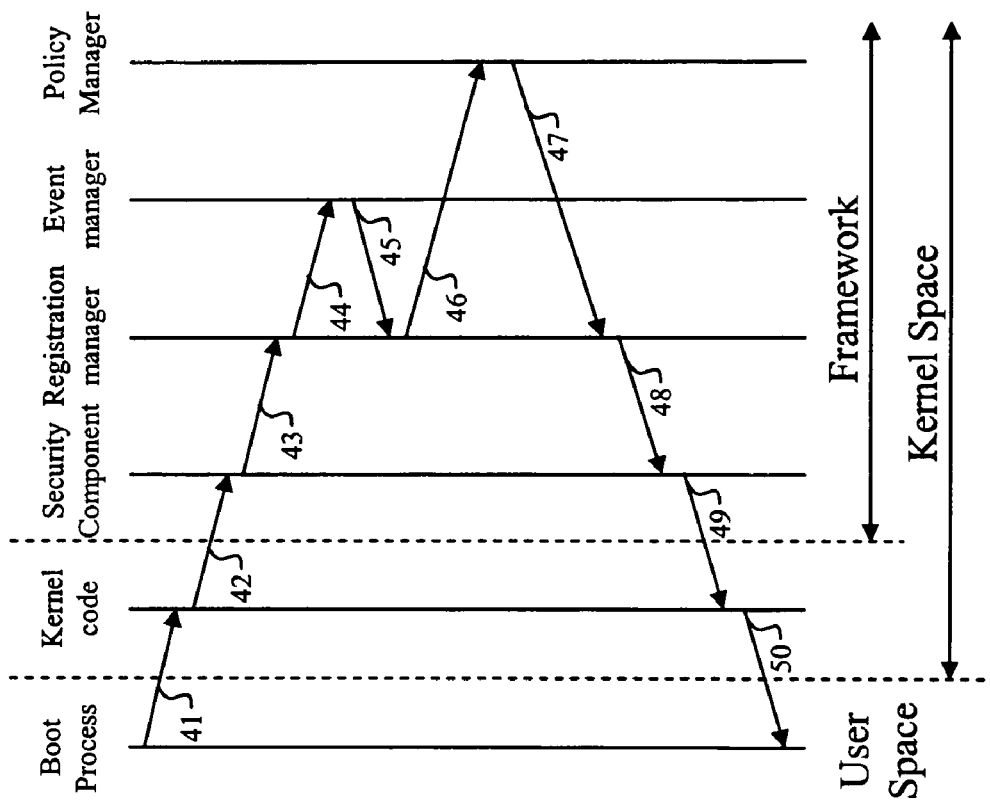
FIG. 4 is a timing diagram illustrating how security components register with the security architecture of the present invention.

Referring to FIG. 4, security components will register with the security architecture as further described below. To enable registration, the security architecture must first make itself be known to other components. This is done with the inter_module_register function call. By registering itself using the key "security_framework", any other Linux loadable module that knows the key can call the registration function made available by the security architecture. Again, it is readily understood that the registration process is generally applicable for other types of operating systems.

During the boot process, system calls are made at 41 to the kernel of the operating system in order to load various modules. The kernel in turn makes a call at 42 to the module's initialization routine. In this context, some of the modules are understood to be security components which will be used by the security architecture. The security component will then call the registration manager 29 at 43 to register with the security architecture.

When the registration manager 29 is called, it expects to be passed the name of the registering component, the component's policy structure, the number of operations in the policy and a placeholder for a return value. As shown at 44, the registration manager 29 is then able to notify the event manager 22. Events embodied in the component's policy structure are parsed and then added to the event log before control is returned at 45 to the registration manager.

Furthermore, the registration manager 29 calls the policy manager 26 at 46. Likewise, the policy is parsed and then inserted into the policy tree by the policy manager before control is returned at 47 to the registration manager.

Finally, the registration manager increments an internal counter and returns the counter value to the registering security component as a unique identifier. In a Linux Security Module, there are provisions for a "security blob" that holds security data relevant to the security module. The security architecture maintains this feature, but to do so there must be some way that each component can refer to its private security blob. The unique component identifier is used as an index into an array of "blobs" that are allocated by the security architecture. Thus, the component itself can allocate its own security blob and then set a pointer to that blob in the array.

Once the registration process is complete, the registration manager 29 passes control at 48 back to the registering component. Upon completing its initialization routine, the security component likewise returns control at 49 to the boot process.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A security architecture comprising:
an electronic device having an operating system, the operating system residing in an execution environment having a user space and a protected memory space residing in a computer memory of the electronic device;
a policy tree residing in the protected memory space of the computer memory and storing a plurality of security policies, each security policy defining at least one system call which correlates to a security operation and a corresponding security component for executing the security operation, wherein said policy tree represents complete paths of system calls to a file or directory, in which nodes store the security policies and security components for implementing the security, wherein a system call is requested from an application to the operating system, and wherein the request is handled by the kernel of the operating system;
a policy manager embodied as computer executable instructions in the protected memory space of the computer memory, the policy manager adapted to intercept a system call made to the operating system and operable to determine an applicable response by searching and interpreting the policy tree; and
an event manager to intercept system calls made to the operating system and operable to determine if the system call may be handled by the architecture.

2. The security architecture of claim 1 further comprises a component manager adapted to receive security policies that match the intercepted system call from the policy manager and operable to call the corresponding security components.

3. The security architecture of claim 1 wherein the operating system is further defined as Linux, such that the event manager is implemented as a Linux Security Module.

4. The security architecture of claim 1 wherein the system calls are passed to the policy manager by a hook defined in source code of the operating system.

5. The security architecture of claim 1 wherein the policy manager determines an applicable response by mapping an intercepted system call to a security operation and passes control to the corresponding security component to execute the security operation.

6. A security architecture comprising:
an electronic device having an operating system, the operating system residing in an execution environment having a user space and a protected memory space residing in a computer memory of the electronic device;
a policy tree residing in the protected memory space of the computer memory and storing a plurality of security policies, each security policy defining at least one system call which correlates to a security operation and a corresponding security component for executing the security operation, wherein said policy tree represents complete paths of system calls to a file or directory, in which nodes store the security policies and security components for implementing the security, wherein a system call is requested from an application to the operating system, and wherein the request is handled by the kernel of the operating system;
a policy manager embodied as computer executable instructions in the protected memory space of the computer memory, the policy manager adapted to intercept a system call made to the operating system and operable to determine an applicable response by searching and interpreting the policy tree;
a registration manager adapted to receive registration requests from security components and operable to register the security components with the security architecture.

7. The security architecture of claim 6 wherein each security component embodies security operations which are associated with one or more system calls and, upon receipt of a registration request, the registration manager inserts the system calls along with a corresponding security operation into the policy tree.

8. The security architecture of claim 6 wherein the system calls are passed to the policy manager by a hook defined in source code of the operating system.

9. The security architecture of claim 6 wherein the policy manager determines an applicable response by mapping an intercepted system call to a security operation and passes control to the corresponding security component to execute the security operation.

10. The security architecture of claim 6 wherein the operating system is further defined as Linux, such that the event manager is implemented as a Linux Security Module.

11. A security architecture comprising:
an electronic device having an operating system, the operating system residing in an execution environment having a user space and a protected memory space residing in a computer memory of the electronic device;
a policy tree residing in the protected memory space of the computer memory and storing a plurality of security policies, each security policy defining at least one system call which correlates to a security operation and a corresponding security component for executing the security operation, wherein said policy tree represents complete paths of system calls to a file or directory, in which nodes store the security policies and security components for implementing the security, wherein a system call is request from an application to the operating system, and wherein the request is handled by the kernel of the operating system;
an event manager adapted to intercept a system call made to the operating system and operable to determine if the system call may be handled, wherein the event manager is implemented as a Linux Security Module and the operating system is a Linux operating system;
a policy manager embodied as computer executable instructions in the protected memory space of the computer memory, the policy manager adapted to receive the intercepted system call from the event manager and operable to search the policy tree for matching security policies; and
a component manager embodied as computer executable instructions in the protected memory space of the computer memory, the component manager adapted to receive security policies that match the intercepted system call from the policy manager and operable to call the corresponding security components;
a registration manager adapted to receive registration requests from security components and operable to register the security components with the security architecture, wherein the registration manager is further adapted to insert the system calls along with a corresponding security operation into the policy tree upon receiving a registration request from a security component.

12. A security system comprising:
an electronic device operating an operating system that has a plurality of security hooks, the operating system residing in an execution environment of the electronic device and having a user space and a protected memory space residing in a computer memory of the electronic device; and
a security module external to the operating system and having
a policy tree residing in the protected memory space of the computer memory and storing a plurality of security policies, wherein each of the plurality of security policies defines a) a security operation that correlates to at least one system call and b) a corresponding security component for executing the security operation, wherein a system call is request from an application to the operating system, and wherein the request is handled by the kernel of the operating system;
a policy manager embodied as computer executable instructions in the protected memory space of the computer memory, the policy manager adapted to intercept a system call made to the operating system and operable to determine an applicable policy by searching and interpreting the policy trees
a component manager that receives a determined policy from the policy manager and that executes the security operation defined by the determined policy by invoking the corresponding security component; and
wherein the security module operates on the electronic device and shares the execution environment with the operating system, wherein the security module is operable to assume security responsibilities of the operating system at least one of the plurality of security hooks by a) intercepting a system call of the operating system and b) granting or denying the intercepted system call.

13. The security system of claim 12, wherein the security module only assumes security responsibilities of granting or denying a system call, of the operating system, to access a file or directory controlled by the operating system.

* * * * *